United States Patent
Milberger et al.

(10) Patent No.: US 6,824,171 B2
(45) Date of Patent: Nov. 30, 2004

(54) RISER CONNECTOR

(75) Inventors: Lionel J. Milberger, Houston, TX (US); Jason C. McCanna, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 0 days.

(21) Appl. No.: 10/646,680

(22) Filed: Aug. 22, 2003

(65) Prior Publication Data

US 2004/0113426 A1 Jun. 17, 2004

Related U.S. Application Data

(60) Provisional application No. 60/405,683, filed on Aug. 23, 2002.

(51) Int. Cl.$^7$ ................................................. F16L 21/08
(52) U.S. Cl. ................... 285/123.13; 285/920; 285/369
(58) Field of Search ............................ 285/920, 123.13, 285/123.3, 382, 369

(56) References Cited

U.S. PATENT DOCUMENTS

| | | | | |
|---|---|---|---|---|
| 591,828 A | * | 10/1897 | Duncan | 285/339 |
| 3,321,217 A | * | 5/1967 | Ahlstone | 285/18 |
| 4,193,617 A | * | 3/1980 | Hitz | 285/336 |
| 4,337,971 A | * | 7/1982 | Kendrick | 285/315 |
| 4,516,795 A | * | 5/1985 | Baugh | 285/315 |
| 4,526,406 A | * | 7/1985 | Nelson | 285/18 |
| 4,693,497 A | * | 9/1987 | Pettus et al. | 285/12 |
| 4,902,044 A | * | 2/1990 | Williams et al. | 285/18 |
| 6,123,363 A | * | 9/2000 | Burgard et al. | 285/24 |
| 6,328,343 B1 | * | 12/2001 | Hosie et al. | 285/90 |
| 6,609,734 B1 | * | 8/2003 | Baugh | 285/322 |

* cited by examiner

Primary Examiner—Eric K. Nicholson
(74) Attorney, Agent, or Firm—Loren Helmreich Browning Bushman, P.C.

(57) ABSTRACT

A tubular connection 7 is provided for connecting an upper tubular member 10 with a lower tubular member 12. A radially movable latch body 20 is positioned outward of the tubular members. Outer load flanks 25 on the latch body are slidably engageable with inner load flanks 24 on the tubular members. A radially projecting member 32 and a corresponding guide recess 34 are provided for guiding the latch body with respect to one of the tubular members. A safety actuator 30 and corresponding mating surface 38 may also be provided for urging the latch body outward.

32 Claims, 4 Drawing Sheets

RISER CONNECTOR

RELATED CASE

This application claims the benefit of Provisional Application No. 60/405,683, filed Aug. 23, 2002.

FIELD OF THE INVENTION

This invention relates to a mechanical connector for connecting tubular members. More specifically, this invention relates to a connector having a latch guide mechanism and a safety piston for urging the latch to an unlatched position.

BACKGROUND OF THE INVENTION

Remotely operated mechanical connectors are used in the oil and gas recovery industry to join generally tubular members. Such connectors typically have the following features:

1. A pair of tubular members to be joined together. Each member bears one or more load shoulders or teeth. Typically, such teeth on a tubular member appear as a series of alternating grooves and ridges.
2. A latch consisting of one or more load shoulders or teeth. The latch is typically disposed about the perimeter of the tubular members in the form of one or more ring segments. The teeth on the latch mate with grooves about the ends of the tubular member to mesh and hold the parts together. Radial movement of the latch ring allows the teeth to be engaged or disengaged.
3. The teeth on the tubular members and latch ring each have a load flank and a stab or back flank. The load flanks of the teeth of the tubular members firmly contact the corresponding load flanks on the mating teeth on the latch ring.
4. Typically, the load flanks of the teeth form a series of conic surfaces around the tubular members and on the inside of the latching ring. The flanks may be angled in such a way that squeezing the latching ring (either whole or segmented) around both of the members results in their being drawn together. This axial movement and force is desirable for a number of reasons, such as to:

Mate or face up the tubular members against an outside resistance or imposed misalignment;

Compress, energize, or otherwise set a gasket or sealing element between or within one or both of the tubular members;

Elastically load, stretch, deflect or otherwise energize the mechanical elements of the connection. This is typically beneficial for keeping a seal and minimizing the fluctuation of stress when the connector is subjected to a variety of fluctuating load conditions.

Compensate for uncertainties of fit and manufacture between the tubular members and other connection components.

5. A primary mechanism, i.e., cams or other moving, impinging surfaces, holds the latch in firm contact with the tubular members. It also applies force to translate the latch from the open position to the engaged position.
6. The primary mechanism applies the force needed to draw the tubular members together and preload them.
7. The latch ring may have a spring bias (inherent or externally applied) to push it either inward or outward, and either towards or away from the mating teeth on the tubular members.
8. The connector must be made to reliably disengage when the duration of service is ended.

Connectors of this type are used within the offshore oil industry to tie a producing wellhead to a riser and production platform. Connectors of this nature must withstand a variety of factors present in large, deepwater developments. Among these are high contained pressures (up to 10,000 psi), high loads (up to millions of pounds tension and foot-pounds bending), long life (20+years), fatigue effects, corrosive environments, and remote operation. Finally, when the well is exhausted, the connection must be removed to decommission the well and allow the production platform to be used elsewhere. Due to the value of the product, and the time-rate cost of all the other high-performance equipment used in association with these connectors, a high premium is placed upon reliability and ease of use.

Two of the aforementioned factors that influence the reliability and ease of use of these connectors are especially germane to the present invention. First, remote operation implies less ability to adjust, control, or finesse the operation of a piece of machinery without careful preparation and design. Second, the long exposure to the deep sea environment and load conditions may make it difficult for the connector to disengage from the wellhead. Causes may include permanent deformation of the latching elements, corrosion, galling/welding, or encrustation by product fluids (methane hydrate ice, wax, asphalts, etc.). An improved connector is therefore desired that is easier to maneuver and is more reliable, especially for use in a harsh, remote location.

The disadvantage of the prior art are overcome by the present invention, and an improved connector assembly and method are hereinafter disclosed.

SUMMARY OF THE INVENTION

A tubular connection is provided for connecting an upper tubular member with a lower tubular member. A radially movable latch body may be positioned outward of each tubular member. At least one inner load flank on each tubular member may be angled with respect to an axis substantially defined by the tubular members. A plurality of outer load flanks on the latch body slidably engage the at least one inner load flank of each tubular member to urge the tubular members axially together. A radially projecting member is fixed to one of the latch body and a one of the tubular members, and a guide recess is provided in the other of the latch body and the one of the tubular members. The guide recess receives the radially projecting member to guide the latch along a desired trajectory with respect to the tubular members when the latch body is moved radially between an unlatch and a latch positions.

A trajectory may be chosen to determine movement of the load flanks on the latch body relative to the respective load flanks on the tubular members. One or both of a length of the radially projecting member and a depth of the guide recess may be selected to limit motion of the latch with respect to the tubular members. The radially projecting member may be at least partially positioned within the guide recess when the latch body is in a radially outward or unlatched position.

The tubular connection may further comprise a safety actuator axially movable with respect to the latch body. A safety shoulder may be fixed with respect to the latch body and engageable by the safety actuator. The safety shoulder may be angled inwardly to urge the latch radially outwardly to the unlatched position. The safety actuator may be hydraulically or pneumatically activated.

A cam member may be included for urging the latch radially inwardly. The cam member may include a cam surface engageable with and angled with respect to the latch body, and is movable axially with respect to the tubular members. The cam member may also be hydraulically or pneumatically activated.

At least one sealing member may be disposed between the upper and lower tubular members for sealing between the tubular members. A load shoulder preferably is also included on each of the upper and lower tubular members. The load shoulders contact to support an axial load between the upper and lower tubular members.

A bias member may be provided for biasing the latch body radially inwardly or outwardly. The bias member may be a spring disposed within or about the latch body, or the latch body may comprise a c-ring or a set of dog/collet segments.

It is an object of this invention to provide a method for connecting an upper tubular member with a lower tubular member. The method includes providing a radially moveable latch body outward of the tubular members, forming at least one inner load flank on each tubular member, with each load flank angled with respect to and radially disposed about an axis of the tubular members, and a plurality of outer load flanks on to the latch body engageable with the at least one inner load flank of each tubular member. The method may include determining a desired trajectory of the inner load flanks with respect to the outer load flanks, and providing a radially projecting member on one of the latch body and one of the tubular members, and a guide recess in the other of the latch body and the tubular members for receiving the radially projecting member and guiding it along the desired trajectory. The latch body may be urged radially inwardly to engage the at least one inner load flank with at least one outer load flank to urge the tubular members axially together.

The method may further comprise providing a cam member having a cam surface angled with respect to the latch body. The cam member may be moved axially with respect to the latch body to urge the latch body radially inwardly. A safety actuator may be provided axially movable with respect to the latch body, and a safety shoulder may be fixed with respect to the latch body. The safety shoulder may be angled inwardly to urge the latch radially outwardly.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
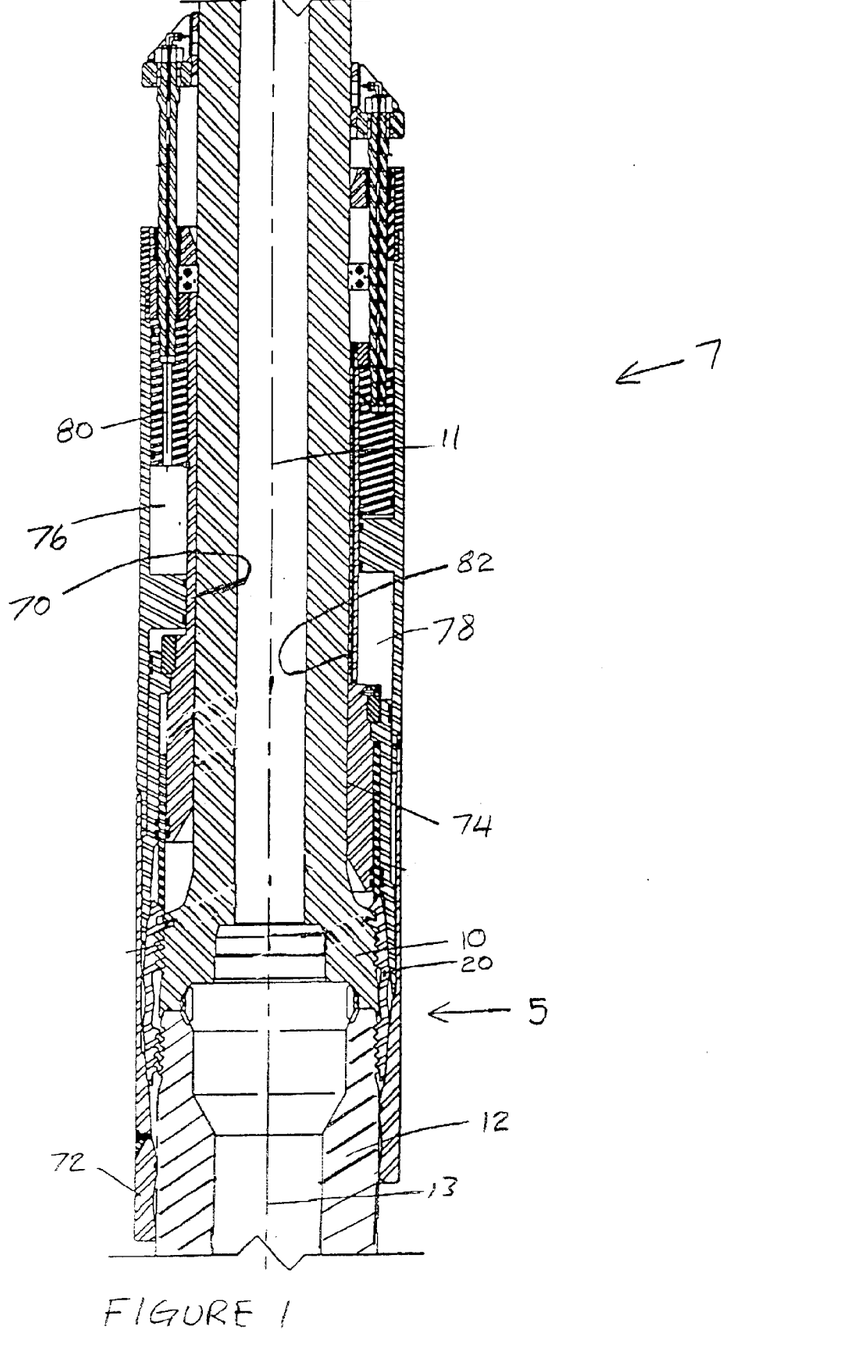
FIG. 1 illustrates a preferred embodiment of the riser connection assembled within a wellbore assembly, with a latch securing the upper and lower tubular members.
Figure 2:
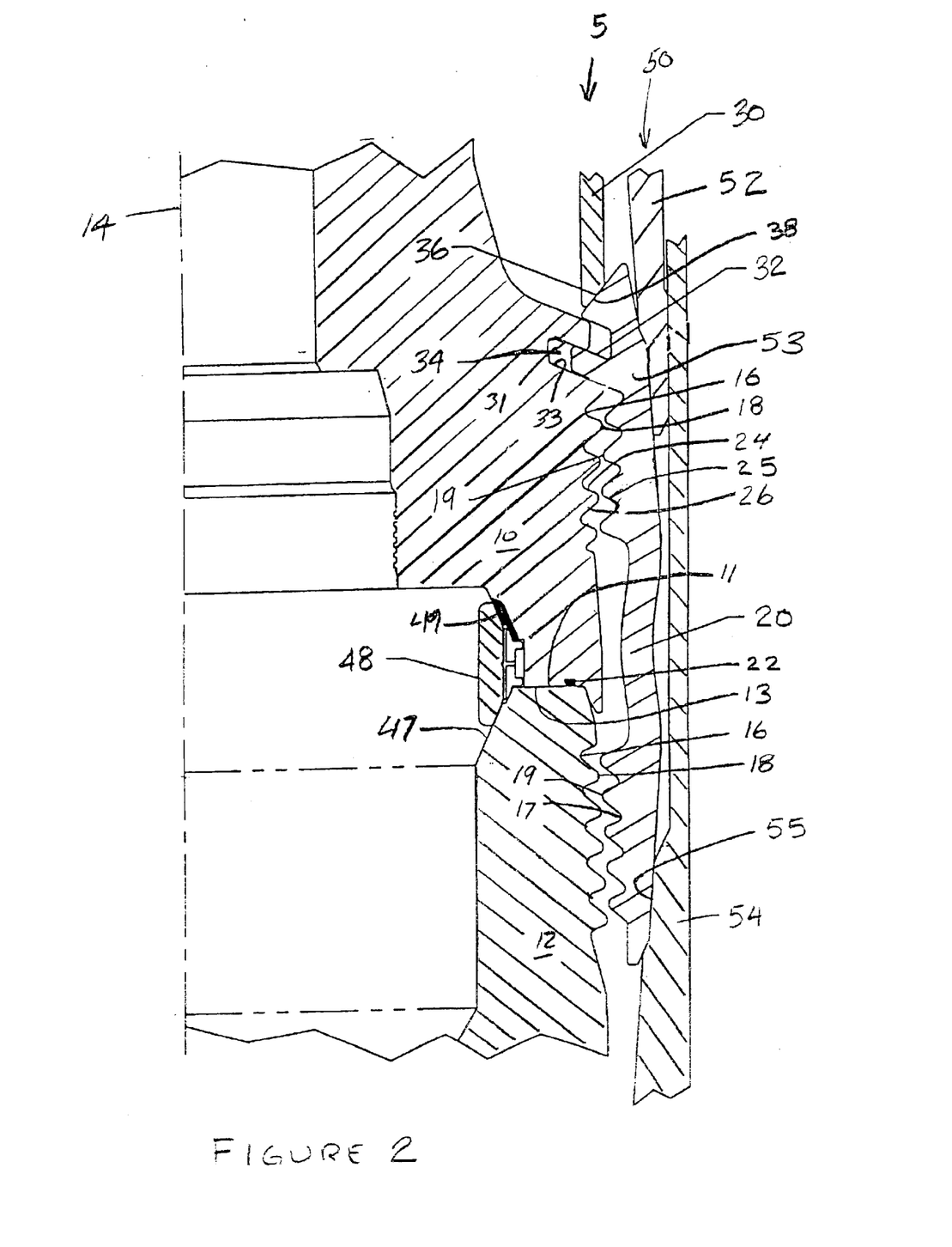
FIG. 2 illustrates a closeup view of a preferred embodiment of the riser connection, with the latch disengaged from the tubular members, and with the radially projecting member on the latch and the guide recess on one of the tubular members.
Figure 3:
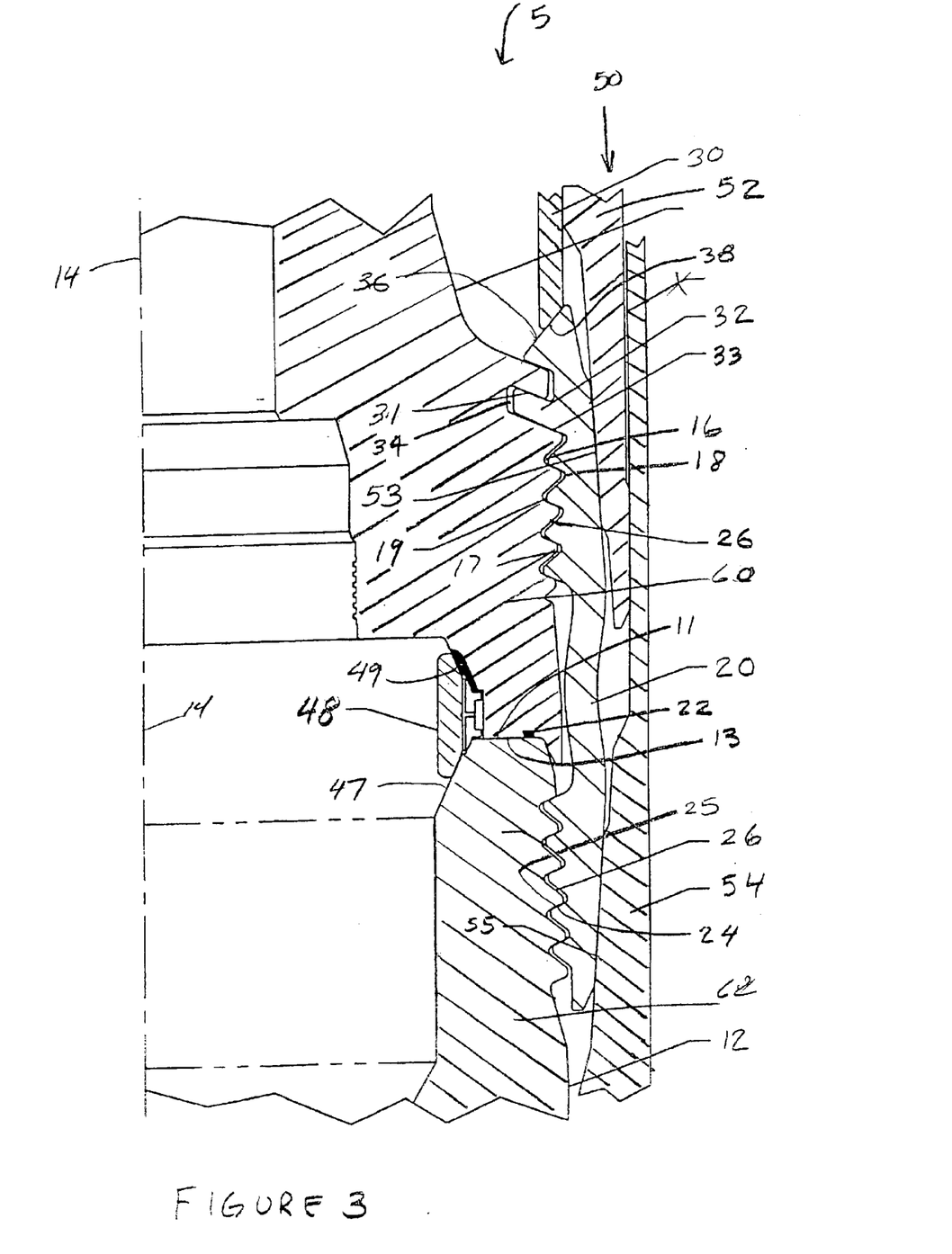
FIG. 3 illustrates the preferred embodiment of FIG. 2, with the latch moved inwardly to engage the tubular members.

FIG. 1 illustrates a preferred embodiment of a riser connection 5 as assembled within a wellbore assembly 7. The left side of FIG. 1 shows the riser connection 5 having a latch body 20 disengaged from an upper and lower tubular member 10, 12 (shown in closer detail in FIG. 2). The right side of FIG. 1 shows the latch body 20 engaged with the tubular members 10, 12 (shown in closer detail in FIG. 3). A pair of tubular members 10, 12, each having a respective longitudinal axis 11, 13, which may be a substantially common axis 14 as shown in FIG. 2, are connected by a latch mechanism or latch ring 20, which may comprise a single c-ring or a set of dog/collet segments. Each of the tubular members 10, 12 preferably has a plurality of grooves 16 near the end portions 60, 62 of each tubular member 10, 12 which define a set of similar teeth 18. Mating grooves 17 and teeth 19 are provided on the latch ring or latch body 20. Radial movement of the latch ring 20 allows the teeth 18, 19 to be engaged or disengaged with the corresponding grooves 16, 17. FIG. 3 more clearly delineates these teeth and grooves.

As the teeth 19 on the latch 20 engage the grooves 16 on the tubular members 10, 12, such as shown in FIG. 2, the tubular members 10, 12 are drawn closer together and eventually preload at an interface between the tubular members 10, 12, defined by end surfaces which serve as load shoulders 11, 13 on the upper and lower tubular members 10, 12 so that the axes 60, 62 of the tubular members 10, 12 are essentially aligned at the common axis 14. The grooves on one of the tubular members may have a load flank 24 and a back or stab flank 26. The load flank 24 may load a corresponding load flank 25 on the mating teeth 19 on the latch body 20.

A single elongated guide member or "elongated tooth" may be provided on at least one of the tubular members 10, 12 axially adjacent the teeth 18. Alternatively, the elongated tooth 32 may be provided on the latch mechanism 20 near one set of the mating teeth 19. The elongated tooth 32 as shown in FIG. 2 mates with a groove 34 in the mating member, i.e., in the tubular member 10. The elongated tooth 32 and mating groove 34 are designed so as to limit motion of the latch mechanism 20 in a direction generally parallel to the load flank 25 of the nearby teeth 19 when the latch ring 20 moves in a direction generally perpendicular to the axis 14 of the tubular members 10, 12.

A safety actuator, such as a single-acting piston 30, is preferably carried by one of the tubular members. The safety piston 30 has motion generally parallel to the axis 14 of the tubular members 10, 12 on which it is carried. One end 38 of the safety piston 30 contacts the latch mechanism 20 through a mating surface 36, which is at an angle with respect to the axis 11 of the tubular member 10 supporting the safety piston 30. The angled surface 36 is designed to cause the latch mechanism 20 to disengage from the tubular members 10, 12 when the safety piston 30 is energized. A second purpose of the safety piston 30, when energized, is to hold the latch mechanism 20 disengaged from the tubular members 10, 12 as one of the tubular members 10 initially engages the other tubular member 12. In combination with the elongated tooth 32, the motion of the latch ring 20 is controlled to be generally parallel to the load flank 25 of the adjacent teeth 19.

The safety activator 30 may also be referred to as an auxiliary mechanism 30 for imposing a trajectory or force upon the latch body 20, independent of the constraints or forces applied by the primary mechanism 50. The primary mechanism 50 may include inner and outer cam members, such as sleeves 52, 54 having cam surfaces 53, 55, which may impinge the latch body 20, as shown in FIGS. 2 and 3. The sleeves 52 and 54 may be moved between alternate positions by an operator. However, the sleeves 52, 54 preferably are not axially fixed to either of the tubular members. Thus, when the sleeves 52, 54 are moved axially apart, the latch ring 20 is permitted to assume an expanded position as in FIG. 2. When the sleeves 52, 54 are moved axially toward one another, the latch ring 20 is forced to tightly engage the upper and lower tubular members 10, 12, as shown in FIG. 3.

In one embodiment of the invention, the position of the latch ring 20 is constrained along a line within the trajectory defined by the guide recess or slot 34. The trajectory is designed as the desired trajectory of the latching element 20 between open is unlatched and closed or latched position. As a result, the guide slot is typically at angle to the axis 14, and in a preferred embodiment is angled generally downward at from about 50° to 70° with respect to axis 14.

The guide slot 34, when viewed as a profile in the thick wall of a tubular member 10, may form a pair of essentially conic surfaces 31, 33 defining a cavity or groove within the tubular wall, as shown in FIG. 2. The conic surfaces 31, 33 may be parallel and concentric. Likewise, the section of the latch ring 20, when viewed as a profile to a ring, may form a flange defined by the outline of the elongated tooth 32. The surfaces of the tooth/flange 32 may be generally parallel and concentric to the surfaces 31, 33 within the cavity in the tube wall.

The elongated tooth/flange 32 in the latching ring 20, when positioned within the slot 34, allows the ring 20 to expand or contract radially with a prescribed axial movement. The combined radial and axial movement may be the desired trajectory for the latching ring 20 to clear or engage the grooves and ridges which form the teeth on the tubular members.

The kinematic motion of the latch ring 20 may thus be defined by the guide slot 34 and the elongated tooth 32. Although desirable, this may not necessarily be sufficient for a robust mechanical connector subject to a variety of installation conditions and uncertainty. For this reason, it may further be desirable to controllably apply a sizable force to the latch ring, such as with the safety actuator 30 discussed above. In some embodiments, one or more force actuators, such as hydraulic pistons or a single annular piston, may be arranged about the perimeter of one of the tubular members 10, 12. The piston(s) may impinge upon the mating surface 36 of the latching ring 20. The orientation of the piston line-of-action and angle of the contacting faces may be arranged to apply a selected vector of force, controllably and on demand, to the latch ring when it is at any position within its prescribed trajectory.

Although an annular piston on one of the tubular members generally has its line-of-action substantially parallel to the tube axis 14. The angled contact face 36 allows the piston 30 to apply a force generally radially to the latch ring 20. Typically, the desired force is directed radially out (i.e., away from the teeth 18 of one tubular member 10) and toward the other tubular member 12.

The annular piston 30 may be single-acting. The returning force to cause movement of the latch 20 to engagement with the tubular members 10, 12, as described above, may be applied by the primary mechanism 50 through its action upon the latch ring 20. The elongated tooth 32 on the latch ring 20 accordingly moves into the guide slot 34 in response to force from the primary mechanism 50, which may push the annular piston 30 toward its latched position.

An alternate embodiment may use the force of an actuator 50 to bias the guide tooth 32 of the latch ring against a single conic surface on the tubular member. That surface and the guide tooth 32 then define the trajectory of the latch ring. The biasing force of the safety actuator may be a substitute for using a second conic face opposite the first to form a guide slot. The force may be applied, holding the latch ring to its trajectory through the majority of the movement it takes to reach its final latched position. The force may then be removed (by relieving the hydraulic pressure behind the piston 30) so as not to interfere when the primary mechanism starts to apply the preload.

It should be noted that the controlling surface or slot, and its mating tooth or flange, may be positioned on either the upper or lower end of the connection. The latch ring may also be located inside the tubular members, and may move radially outward to effect the connection with teeth or the inside of the tubular members. The latch ring may also have a spring bias to the lateral or the unloaded position. The auxiliary force actuator may still be designed to direct the latch ring away from the teeth.

The long tooth 32 extends radially inward substantially beyond the innermost portion of the teeth adjacent the tooth 32, as shown in FIG. 2. More particularly, FIG. 2 illustrates that the long tooth or flange has a radial dimension at least about twice the radial depth of the adjacent teeth, such that in the unlatched position with the profiles 16, 18 are both spaced radially inward of the profiles 17, 19, the long tooth 32 is still captured at least partially within the slot 34.

The present invention may comprise a kinematic guide and independently controlled force actuator to control the force and motion of a latching element independently of the primary, high-force mechanism 50. A number of advantages are gained by this, technique including high performance, high capacity, long-life connectors capable of use in deep water, and remotely operated connections.

During the operation of these connectors, one tubular member—with attached latch ring and other connector components—is typically lowered into close proximity to the other member, i.e., the wellhead. The tubular member is then brought stabbed over or into the wellhead. Due to the remote nature of this operation, there is a possibility that a connector not so equipped in the manner discussed above may be bumped against the other, stationary member. Other uncontrolled or external forces, including as gravity, also affect the alignment and stabbing operation.

The several moving parts of the connection, including the primary mechanism 50 and latch ring 20 be perturbed to a less than ideal position in such an event. The perturbation may be enough in some cases to misalign the latch ring and teeth and therefore prevent makeup of the connector. In another situation, the perturbation may advance the latch ring in its trajectory prematurely. If the latch ring begins to close before the tubular members are properly aligned, it may again prevent makeup or reduce the amount of preload achieved on final makeup.

In the described invention, the kinematic constraint prevents perturbation of the latch ring outside of its prescribed trajectory. Meanwhile, an active force actuator prevents premature advancement of the latch ring within that trajectory. In this respect, the force actuator is a safety actuator to prevent premature or unwanted actuation of the connector. The safety piston also reduces the probability of a perturbation during stab-in. At full stroke, the piston 30 holds the latch ring 20 centered to the tubular member and fully open. The piston 30 may be continuously energized throughout the stab-in operation, holding the latch ring in its selected position.

Independent control of the latch ring afforded by the guide slot and safety piston allows optimizing the design of the primary latch mechanism 50 to apply the best force vector for preloading and holding the connection, without compromise for stability against perturbations. The inclusion of an independent force actuator or safety piston allows the kinematic constraint and the load flanks of the teeth to be optimized in design to draw the tubular members together to mate and preload, without compromise for stability against bumps or other perturbations.

In some embodiments, the safety piston may continue to apply a bias force against the latch ring through the majority of the closure and engagement process to keep positive contact with the primary mechanism and decrease sensitivity to any further perturbations.

The safety piston may also help to guarantee release when the connector must be disengaged after being tightly connected and loaded for many years. As the primary mechanism withdraws, the safety piston may apply a force pushing the latch ring away from the teeth, offsetting any tendency to stick.

In one embodiment, the lower tubular member may be the upper end of a subsea wellhead member, and the upper tubular member may be the lower end of a riser adapted to extend upwardly to a drilling vessel at the water surface. Thus, the lower end of the upper tubular member of the connector may be lowered into position over the upper end of the lower member for releasably latching the riser to the upper end of the wellhead member.

The inner diameters of the tubular members 10, 12 may have matching conical tapers 47, 49 about their inner diameters to receive a sealing member, such as gasket 48 for sealing between members 10, 12 when the members are in latched position. In addition, a seal 22 may be provided at the interface defined by load shoulders 11 and 13. The load shoulders may comprise a wide, blunt profile, as shown, to withstand axial forces between upper and lower tubular members 10, 12.

As shown in FIG. 1, a mechanism for moving the tubular members toward and away from one another may include a piston 70 on the inner side of an outer tubular sleeve 72 for sealably sliding over the outer side 74 of the upper tubular member 10 to form upper and lower pressure chambers 76 and 78. With reference to FIG. 2, the upper and lower tubular members 10, 12 may move to their unlatching position when pressure fluid is supplied to the upper chamber 76 of the piston 70 and exhausted from the lower chamber 78 thereof. Conversely, when pressure is supplied to the lower chamber 78 and exhausted from the upper chamber 76, the tubular members 10, 12 are moved to latching position.

Figure 4:
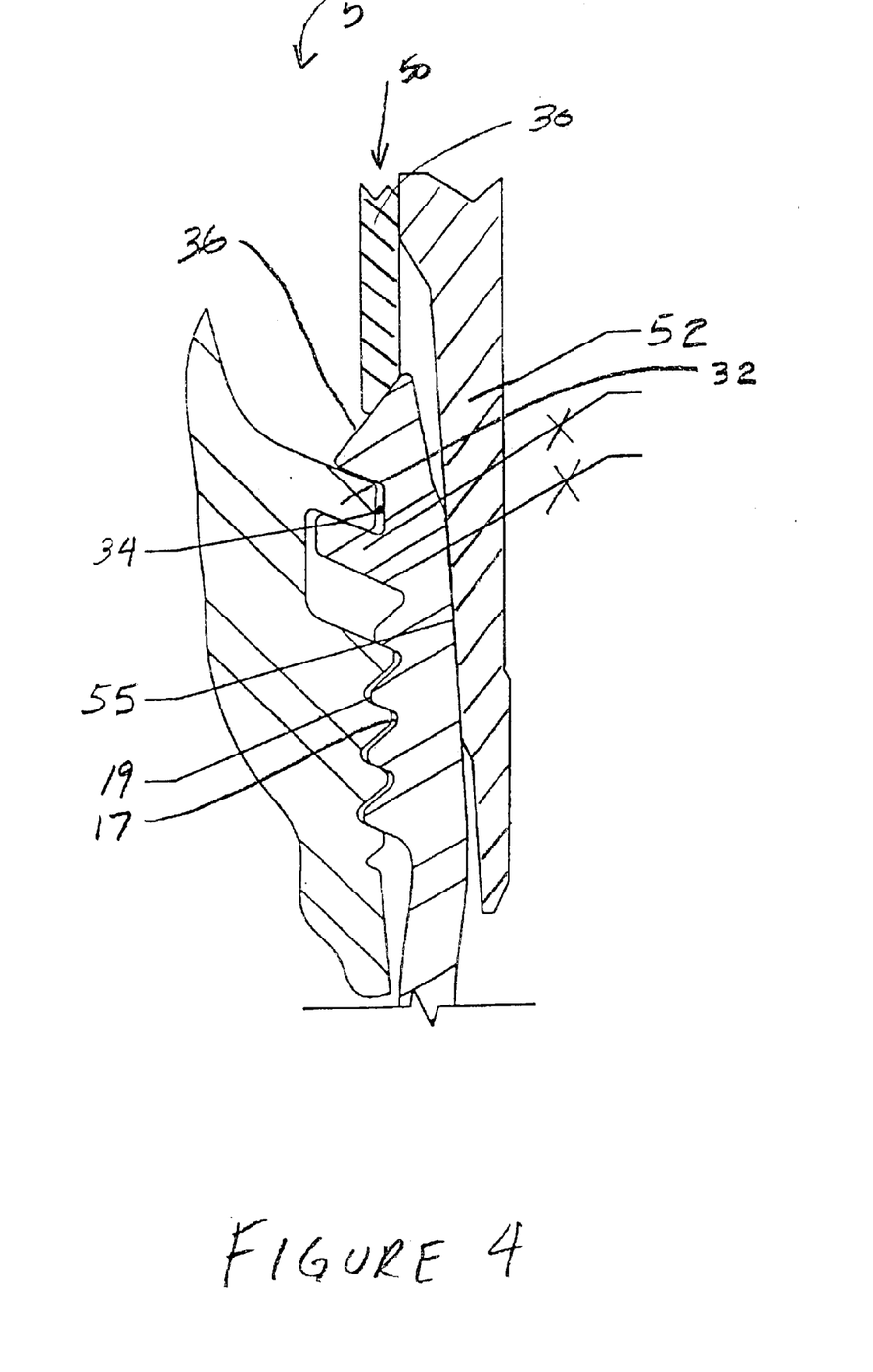
FIG. 4 illustrates an alternate embodiment, wherein the radially projecting member is secured to one of the tubular members and the guide recess is in the latch.

Unlatching fluid pressure may be supplied through a port 80, while the connector is moved to a released position by pressure fluid supplied to the lower chamber 78 through port 82 while being exhausted from the upper chamber 76 through port(s) 80. An alternate embodiment may place the guide flank upon the latch ring, and the guide flange upon the upper tubular member, as shown in FIG. 4.

While preferred embodiments of the present invention have been illustrated in detail, it is apparent that other modifications and adaptations of the preferred embodiments will occur to those skilled in the art. The embodiments shown and described are thus exemplary, and various other modifications to the preferred embodiments may be made which are within the spirit of the invention. Accordingly, it is to be expressly understood that such modifications and adaptations are within the scope of the present invention, which is defined in the following claims.

What is claimed is:

1. A tubular connection for connecting an upper tubular member having an upper axis with a lower tubular member having a lower axis, the tubular connection comprising:

a latch body radially movable between an unlatch position and a latched position;

an engaging surface on the upper tubular member for substantially planar engagement with a stop surface on the lower tubular member;

at least one inner load flank on each tubular member, a load flank on at least one tubular member angled with respect to the axis of the at least one tubular member;

at least one outer load flank on the latch body for engaging the at least one inner load flank on each tubular member to urge the engaging surface axially toward the stop surface;

a radially projecting member on one of the latch body and one of the tubular members, the projecting member extending radially inward substantially beyond the at least one inner load flank on the latch body axially adjacent the projecting member, or extending radially outward substantially beyond the at least one outer load flank on the tubular member axially adjacent the projecting member; and a guide recess in the other of the latch body and the one of the tubular members for receiving the radially projecting member to guide the latch body and the at least one outer load flank for engaging each tubular member along a desired trajectory generally parallel to a load flank adjacent the radially projecting member when the latch body is moved radially from the unlatch position to the latched position.

2. A tubular connection as defined in claim 1, wherein at least one of a radial length of the radially projecting member and a radial depth of the guide recess limits movement of the latch body with respect to the tubular members.

3. A tubular connection as defined in claim 1, wherein the radially projecting member is at least partially positioned within the guide recess when the latch body is in the unlatched position and the inner load flanks on each tubular member are radially spaced from the outer load flanks.

4. A tubular connection as defined in claim 1, further comprising:

an actuator axially movable with respect to the latch body; and a shoulder on the latch body moveable by the actuator, the shoulder angled to urge the latch body and the at least one outer load flank for engaging each tubular member radially outward.

5. A tubular connection as defined in claim 4, wherein the actuator is fluid powered.

6. A tubular connection as defined in claim 1, further comprising:

an axially moveable cam member for simultaneously urging the outer load flank on the latch body for engaging each tubular member radially inwardly, the cam member having a cam surface tapered at a substantially constant angle with respect to the latch body.

7. A tubular connection as defined in claim 6, wherein the cam member is axially moveable in respect to fluid pressure.

8. A tubular connection as defined in claim 1, further comprising:

at least one elastomeric sealing member for sealing between the tubular members.

9. A tubular connection as defined in claim 1, further comprising:

The latch body has a spring bias toward the unlatched position.

10. A tubular connection as defined in claim 9, wherein the latch body comprises a c-ring.

11. A tubular connection as defined in claim 1, wherein the latch body comprises a c-ring.

12. A tubular connection for connecting an upper tubular member having an upper axis with a lower tubular member having a lower axis, the tubular connection comprising:

a latch body radially movable between an unlatch position and a latch position;

at least one inner load flank on each tubular member, a load flank on at least one tubular member angled with respect to the axis of the at least one tubular member;

a fluid pressured cam member for urging the latch body radially inwardly, the cam member having a cam surface tapered at a substantially constant angle with respect to the latch body;

at least one inner load flank on each tubular member, a load flank on at least one tubular member angled with respect to the axis of the at least one tubular members;

at least one load flank on the latch body for engaging the at least one inner load flank on each tubular member to urge the engaging surface axially toward the stop surface;

at least one sealing member for sealing between the tubular members;

a radially projecting member on one of the latch body and one of the tubular members, the projecting member extending radially inward substantially beyond the at least one inner load flank on the latch body axially adjacent the projecting member, or extending radially outward substantially beyond the at least one outer load flank on the tubular member axially adjacent the projecting member;

a guide recess in the other of the latch body and the one of the tubular members for receiving the radially projecting member to guide the latch body along a desired trajectory when the latch body is moved radially from the unlatch position to the latched position;

a fluid pressured actuator axially moveable with respect to the latch body; and a shoulder on the latch body moveable by the actuator, the shoulder angled to urge the latch body and the at least one outer flank for engaging each tubular member radially outward.

13. A tubular connection as defined in claim 12, further comprising:

the latch body having a spring bias toward the unlatched position.

14. A tubular connection as defined in claim 12, wherein the latch body comprises a c-ring.

15. A method of connecting an upper tubular member with a lower tubular member, the method comprising:

positioning a radially moveable latch body radially outward of each tubular member;

providing at least one inner load flank on each tubular member, a load flank on at least one tubular member angled with respect to an axis of the at least one tubular member;

providing at least one outer load flank on the latch body engageable with the at least one inner load flank on each tubular member;

providing a radially projecting member on one of the latch body and one of the tubular members, the projecting member extending radially inward substantially beyond the at least one inner load flank on the latch body axially adjacent the projecting member, or extending radially outward substantially beyond the at least one outer load flank on the tubular member axially adjacent the projecting member;

providing a guide recess in the other of the latch body and the one of the tubular members for receiving the radially projecting member to guide the latch body and the at least one outer load flank for engaging each tubular member along a desired trajectory generally parallel to a load flank adjacent the radially projecting member when the latch body is moved radially from the unlatch position to the latched position;

urging the latch body radially inwardly to engage the at least one inner load flank with the plurality of outer load flanks, and to urge the tubular members axially toward each other.

16. A method as defined in claim 15, wherein urging the latch body radially inward comprises:

providing a cam member having a cam surface tapered at a substantially constant angle with respect to the latch body; and moving the cam member axially with respect to the latch body to simultaneously urge the outer load flank on the latch body for engaging each tubular member radially to the latch position.

17. A method as defined in claim 15, further comprising:

providing an actuator axially movable with respect to the latch body and a shoulder fixed with respect to the latch body, the shoulder angled to urge the latch body and the at least one load flank for engaging each tubular member to the unlatch position.

18. A tubular connection as defined in claim 1, wherein the guide recess contains conic surfaces which are generally parallel and concentric to surfaces of radially projecting member.

19. A tubular connection as defined in claim 1, wherein the radially projecting member has a radial dimension of at least about twice a radial depth of an adjacent load flank, such that in the unlatched position the at least one outer load flank is radially spaced from the at least one inner load flank while the projecting member is still positioned within the guide recess.

20. A tubular connection as defined in claim 1, wherein the radially projecting member is supported on the latch body and the guide recess is provided in the one of the tubular members.

21. A tubular connection as defined in claim 1, wherein the radially projecting member is a circumferentially elongate member with a configuration of a flange.

22. A tubular connection as defined in claim 1, wherein each of the at least one outer load flank on the latch body is radially spaced from the at least one inner load flank on each tubular member when the latch body is in the unlatched position.

23. A tubular connection as defined in claim 1, wherein a radially outward surface on the latch body engages an axially movable cam member urging the outer load flanks on the latch body for engaging each tubular member radially inward, the cam member having a cam surface tapered at a substantially constant angle.

24. A tubular connection for connecting an upper tubular member having an upper axis with a lower tubular member having a lower axis, the tubular connection comprising:

a latch body radially movable between an unlatch position and a latched position;

an engaging surface on the upper tubular member for substantially planar engagement with a stop surface on the lower tubular member;

at least one inner load flank on each tubular member, a load flank on at least one tubular member angled with respect to the axis of the at least one tubular member;

at least one outer load flank on the latch body for engaging the at least one inner load flank on each tubular member to urge the engaging surface axially toward the stop surface;

a radially projecting member on one of the latch body and one of the tubular members, the projecting member extending radially inward substantially beyond the at least one inner load flank on the latch body axially adjacent the projecting member, or extending radially outward substantially beyond the at least one outer load flank on the tubular member axially adjacent the projecting member;

a guide recess in the other of the latch body and the one of the tubular members for receiving the radially projecting member to guide the latch body along a desired trajectory when the latch body is moved radially from the unlatch position to the latched position; and an axially moveable cam member for simultaneously urging the outer load flank on the latch body for engaging each tubular member radially inwardly, the cam member having a cam surface tapered at a substantially constant angle with respect to the latch body.

25. A tubular connection as defined in claim 24, further comprising:

an actuator axially movable with respect to the latch body; and a shoulder on the latch body moveable by the actuator, the shoulder angled to urge the latch body and the at least one outer load flank for engaging each tubular member radially outward.

26. A tubular connection as defined in claim 24, further comprising:

wherein the radially projecting member is at least partially positioned within the guide recess when the latch body is in the unlatched position and the inner load flanks on each tubular member are radially spaced from the outer load flanks.

27. A tubular connection as defined in claim 24, further comprising:

the latch body has a spring bias toward the unlatched position.

28. A tubular connection as defined in claim 24, wherein the latch body comprises a c-ring.

29. A tubular connection as defined in claim 24, further comprising:

another axially moveable cam member for urging a latch body radially inwardly, the another cam member having another cam surface tapered at a substantially constant cam angle with respect to the latch body.

30. A tubular connection as defined in claim 24, wherein the radially projecting member is a circumferentially elongate member with a configuration of a flange.

31. A tubular connection as defined in claim 24, wherein each of the at least one outer load flank on the latch body is radially spaced from the at least one inner load flank on each tubular member when the latch body is in the unlatched position.

32. A tubular connection as defined in claim 24, wherein a radially outward surface on the latch body engages an axially movable cam member simultaneously urging the outer load flanks on the latch body for engaging each tubular member radially inward, the cam member having a cam surface tapered at a substantially constant angle.

* * * * *